US008843415B2

(12) United States Patent
Karabulut et al.

(10) Patent No.: US 8,843,415 B2
(45) Date of Patent: Sep. 23, 2014

(54) SECURE SOFTWARE SERVICE SYSTEMS AND METHODS

(75) Inventors: Yuecel Karabulut, Milpitas, CA (US); Isaac Nassi, Los Gatos, CA (US)

(73) Assignee: SAP AG, Walldorf (DE)

( * ) Notice: Subject to any disclaimer, the term of this patent is extended or adjusted under 35 U.S.C. 154(b) by 1265 days.

(21) Appl. No.: 12/245,559

(22) Filed: Oct. 3, 2008

(65) Prior Publication Data

US 2010/0088236 A1   Apr. 8, 2010

(51) Int. Cl.
| | |
|---|---|
| G06Q 99/00 | (2006.01) |
| G06F 21/10 | (2013.01) |
| G06F 21/33 | (2013.01) |
| H04L 29/06 | (2006.01) |
| G06Q 20/38 | (2012.01) |

(52) U.S. Cl.
CPC ............ G06F 21/10 (2013.01); *G06Q 20/3823* (2013.01); *G06Q 2220/18* (2013.01); G06F 21/335 (2013.01); *G06F 2221/2151* (2013.01); H04L 63/0807 (2013.01); *H04L 63/102* (2013.01); *H04L 2463/101* (2013.01)
USPC .......................................... 705/59; 713/152

(58) Field of Classification Search
USPC .......................................... 705/59; 713/152
See application file for complete search history.

(56) References Cited

U.S. PATENT DOCUMENTS

| | | | | |
|---|---|---|---|---|
| 6,185,685 | B1 * | 2/2001 | Morgan et al. ................ | 713/183 |
| 6,816,970 | B2 * | 11/2004 | Morgan et al. ................ | 713/183 |
| 7,650,498 | B2 * | 1/2010 | Goh et al. ..................... | 713/161 |
| 7,725,404 | B2 * | 5/2010 | Sellars et al. .................. | 705/76 |
| 7,822,689 | B2 * | 10/2010 | Camenisch .................... | 705/71 |
| 2001/0001876 | A1 * | 5/2001 | Morgan et al. ................ | 713/171 |
| 2006/0173794 | A1 * | 8/2006 | Sellars et al. .................. | 705/76 |
| 2007/0118886 | A1 * | 5/2007 | Martin ........................... | 726/5 |
| 2007/0206799 | A1 * | 9/2007 | Wingert et al. ............... | 380/285 |
| 2007/0244833 | A1 * | 10/2007 | Camenisch .................... | 705/71 |
| 2008/0059789 | A1 * | 3/2008 | Lucidarme .................... | 713/153 |
| 2009/0248435 | A1 * | 10/2009 | Macwan ......................... | 705/1 |

OTHER PUBLICATIONS

Olivereau et al, "An Advanced Authorization Framework for IP-based B3G Systems", IST FP6 Integrated Project DAIDALOS, Feb. 6, 2005.
Bijwaard et al, "The Daidalos project and standardizing NGN in ETSI TISPAN—an overview", IST FP6 Integrated Project DAIDALOS, Sep. 2005.
Czerwinski et al, "An Architecture for a Secure Service Discovery Service", Mobicom '99, Seattly Washington, Aug. 1999.

\* cited by examiner

*Primary Examiner* — James D Nigh
(74) *Attorney, Agent, or Firm* — Fountainhead Law Group PC

(57) ABSTRACT

In one embodiment the present invention includes a method of performing a secure transaction in a software system, such as a software service system, for example. Embodiments of the invention include encoding symmetric keys for securing transactions between a service consumer and service provider. Asymmetric keys are also used for providing additional security during transactions. In one embodiment, license tokens and capability tokens are encoded and passed between a service consumer and service provider for allowing a consumer secure access to authorized services.

15 Claims, 13 Drawing Sheets

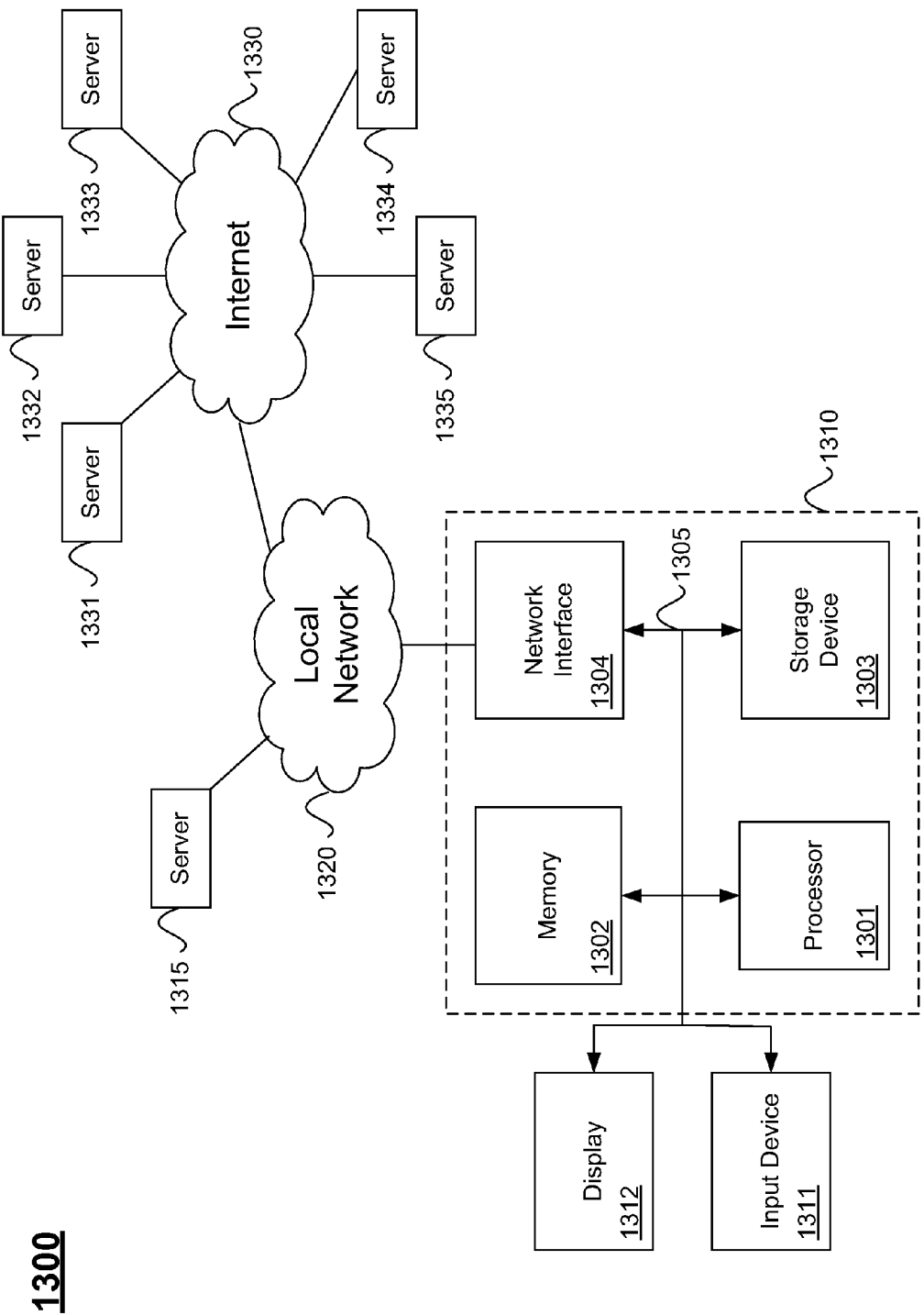

SECURE SOFTWARE SERVICE SYSTEMS AND METHODS

BACKGROUND

The present invention relates to software, and in particular, to secure software service systems and methods.

Software security is an increasingly important area of technology. As more information is processed electronically, software system developers are increasingly concerned with a variety of security issues such as authorization and processes for determining authorized use, for example. Security concerns are especially important in enterprise systems and service oriented systems such as software-as-a-service ("SaaS").

For example, software is increasingly being delivered on the service oriented architecture ("SOA") model. SOA represents a model in which functionality is decomposed into services, which can be distributed over a network and can be combined together and reused to create (composite) applications. Current license-based pricing (perpetual licensing) for software is mainly based on per processor or per registered user. Changes in technology (e.g. SOA) and in usage (e.g. Internet-based vs. intranet-based) are causing software vendors to look at other models for charging for their software. In particular, software-as-a-service ("SaaS") customers are putting increased pressure on application vendors to come up with more flexible pricing models that meet their business needs. Over recent years there has been an increased level of interest in utility pricing for software. The focus of this topic is to create new operating cost models where the unit costs are directly tied to the business operations to which they contribute. Simply put, customers would pay for what they use. For instance, a business software vendor would set his utility price on a per-enterprise service or business process basis, or a search engine vendor might base his pricing on a per-search basis. While creating a fine-granular operating cost model is very important, the real world implementations of technology platforms offering such models will require a set of security mechanisms in order to create a secure and trustworthy service consumption environment.

Thus, there is a need to improve security in software. As a specific example, there is a need to provide security mechanisms in software which offers business functionality as individual or composed software services. The present invention solves these and other problems by providing secure software service systems and methods.

SUMMARY

Embodiments of the present invention improve security in software service transactions. In one embodiment the present invention includes a method of performing a secure software service transaction comprising performing a first transaction between a software service consumer and a software service provider, the first transaction comprising receiving a license token request from a service consumer and sending a license token to the service consumer in response to the request, performing a second transaction between the software service consumer and the software service provider, the second transaction comprising receiving a capability token request from the service consumer, the capability token request including the license token, and sending a capability token to the service consumer in response to the request, performing a third transaction between the software service consumer and the software service provider, the third transaction comprising receiving a service request from the service consumer, the service request including the capability token, and sending a result to the service consumer in response to the request if the capability token authorizes the service consumer to use the software service, wherein the first, second, and third transactions each use symmetric keys shared between the software service consumer and the software service provider to encode information sent between the service consumer and service provider.

In one embodiment, the license token is encoded with a symmetric key shared between a licensing software component for issuing license tokens and a capability token component for issuing capability tokens.

In one embodiment, for the first transaction, the license token request is received in a licensing software component, and wherein the licensing component uses a first symmetric key to encode information sent to the service consumer.

In one embodiment, the licensing software component generates the first symmetric key and a second symmetric key in response to receiving the license token request, and wherein the second symmetric key is for use in the second transaction.

In one embodiment, the licensing software component generates the first symmetric key and encodes the first symmetric key using asymmetric encryption and sends the encoded first symmetric key to the service consumer.

In one embodiment, the asymmetric encryption is a private key, and wherein the licensing software component sends a public key to the service consumer to decode the first symmetric key.

In one embodiment, the information sent to the service consumer encoded using the first symmetric key includes information about where to obtain the capability token.

In one embodiment, the licensing software component generates a second symmetric key for use during the second transaction, and wherein the information sent to the service consumer encoded using the first symmetric key includes the second symmetric key.

In one embodiment, the licensing software component further embeds the second symmetric key in the license token.

In one embodiment, the capability token authorizes the service consumer to use one of a plurality of software services available from said service provider.

In one embodiment, during the first transaction, the service consumer obtains a first symmetric key for secure communication with a capability token component, and wherein the first symmetric key is further sent from the service consumer to the capability token component embedded in the license token.

In one embodiment, the method further comprises sending information for authenticating the service consumer from the service consumer to the capability token component, wherein the information for authenticating is encoded using the first symmetric key, and wherein the capability token component extracts the first symmetric key from the license token, decodes the information for authenticating, and authenticates the service consumer.

In one embodiment, the capability token component generates a capability token if the service consumer is authorized.

In one embodiment, the capability token is encoded using a symmetric key shared between the capability token component and a second service provider software component for providing software services, the third transaction further comprising decoding the capability token using the shared symmetric key, authorizing the service consumer to access a service specified by the capability token, generating a second capability token comprising a reference to a software services, and sending the second capability token to the software consumer.

In one embodiment, the second capability token is encoded using a second symmetric key shared between the service consumer and said second service provider component.

In one embodiment, the capability token is encoded with a symmetric key shared between a capability token component for issuing capability tokens and a backend system component for performing software services.

In one embodiment, at least one of the first, second, and third transactions use an asymmetric key to encode information sent between the service consumer and service provider.

In one embodiment, the method further comprises, in the software service provider, sending a delegation token to a capability token component from a second component of the service provider, wherein the delegation token authorizes the capability token component to issue capability tokens for using particular software services available from said service provider.

In one embodiment, the delegation token is encoded using a symmetric key shared between the capability token component and the second component.

In one embodiment, service request and the result of the third transaction are encoded using a symmetric key shared between the service consumer and a software component in the service provider for controlling access to software services.

The following detailed description and accompanying drawings provide a better understanding of the nature and advantages of the present invention.

BRIEF DESCRIPTION OF THE DRAWINGS

FIG. 13 illustrates computer hardware system for implementing embodiments of the present invention.

DETAILED DESCRIPTION

Described herein are techniques for secure software service systems and methods. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
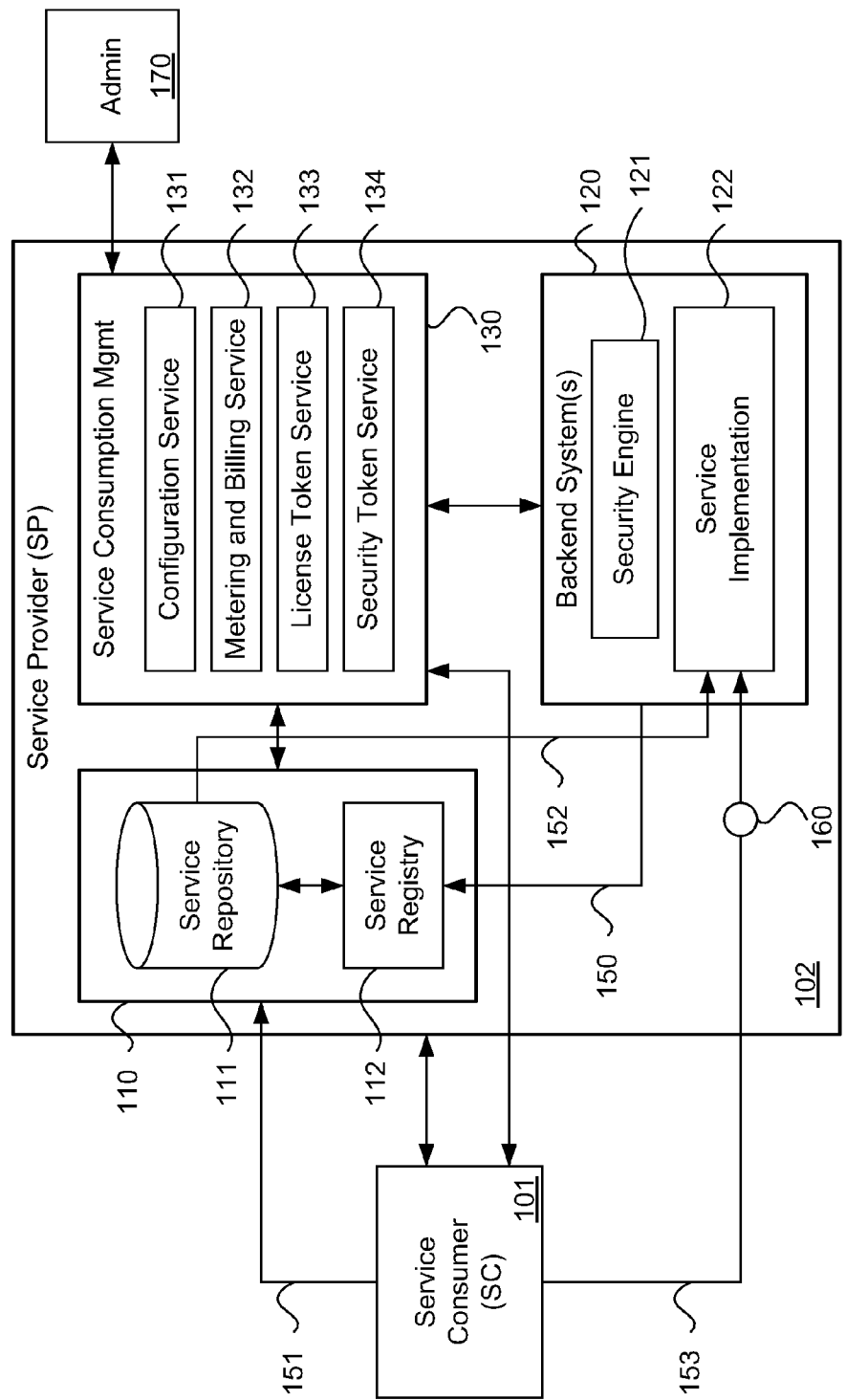
FIG. 1 shows an example software service consumption management system according to one embodiment of the present invention.

FIG. 1 shows an example software service consumption management system according to one embodiment of the present invention. An example implementation of services supported by the system may include enterprise services. A service consumer (herein, "SC" or "consumer") 101 may desire to use the software services provided by a service provider (herein, "SP" or "provider") 102. Consumer 101 may submit service requests to provider 102 over one or more networks, for example, and receive results. Provider 102 may maintain a service repository 111 and a service registry 112. Service repository 111 may be a central repository in which service interfaces and enterprise services are modeled and where associated metadata is stored, for example. The service registry provides a directory (e.g., a yellow pages) of services, and may support publishing, classifying, and discovering services.

Service provider 102 may host a variety of backend systems ("BS") 120 and a service consumption management system ("SCMS") 130 (e.g., an enterprise SCMS). SCMS 130 may include a configuration service 131, a metering and billing service 132, a license token service 133, and a secure token service 134. Configuration service ("CS") 131 may support configuration of contracts, tariff plans, and pricing rules. The CS 131 may be used by a service level agreement ("SLA") administrator 170, for example. The metering and billing service ("MBS") 132 may calculate charges and associate each charge with an account. The license token service ("LTS") 133 provides functionality for issuance and validation of license tokens. The secure token service ("STS") 134 provides functionality for issuance, exchange, and validation of tokens for accessing the backend services (e.g., capability tokens and delegation tokens). In this disclosure, the terms secure token service ("STS"), capability token component, capability token distribution component are used to refer to software components that issue capability tokens according to a protocol, of which an STS as described herein is only an example. The backend system 120 hosts service implementations and may include a security engine for handling the backend system security related operations such as access management and encryption.

Embodiments of the present invention include systems and methods for securing processes for software services. In one embodiment, the consumer 101, LTS 133, STS 134, and backend system 120 may present public keys. In one embodiment, the consumer 101, LTS 133, STS 134, and backend system 120 may have security mechanisms to provide asymmetric and symmetric cryptography operations. In one embodiment, the STS and BS may grant capability tokens and provide other operations associated with processing capability tokens. The BS may also grant delegation tokens. Additionally, some backend systems may follow security policies that are expressed in terms of capabilities. Embodiments of the invention may also use a combination of asymmetric and symmetric cryptography. In one embodiment, asymmetric cryptography is used for an initial authentication step and service request step, which is described in more detail below. Asymmetric cryptography may also be used for issuing capability and delegation tokens, and each token may be signed with the private key of the signing party, for example, as described below.

In some embodiments, an authorizing service (e.g., the LTS, STS and BS) autonomously follows a security policy which ensures that the requested service (e.g. a request to get a license/service token or a capability token) is delivered only to appropriate requestor (e.g., the SC). For example, requestors may be required to provide evidence that they are eligible for requested service, and authorizers may inspect such evidence and to determine if the requester is authorized and to determine the appropriate service to be performed. Furthermore, an authorizer may verify that a particular service is actually usable to only that requestor which provided the appropriate credentials (e.g. asymmetric or symmetric cryptographic tokens).

Figure 2:
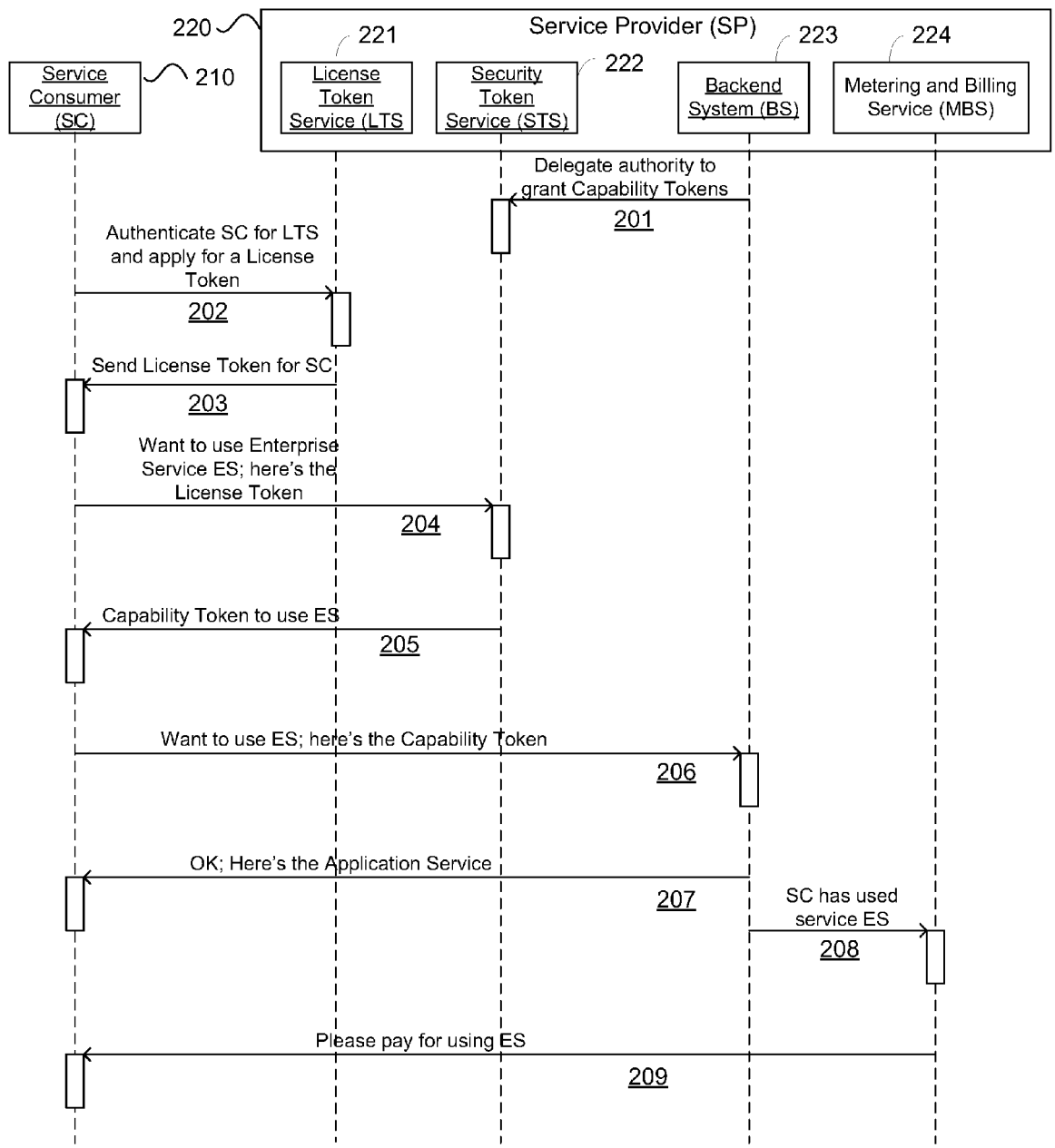
FIG. 2 shows an example software service consumption protocol according to one embodiment of the present invention.

FIG. 2 shows an example software service consumption protocol according to one embodiment of the present invention. In one embodiment, the secure service consumption protocol may include multiple phases, including a capability delegation phase 201, an authentication and license token request phase 202, a license token delivery phase 203, a capability token request phase 204, a capability token delivery phase 205, an enterprise service request phase 206, a service result delivery phase 207, a service metering phase 208, and a payment phase 209. Service consumer ("SC") 210 and service provider ("SP") 220 may communicate over a secure channel. Additionally, an SLA may be been signed or otherwise agreed upon, which includes the contractual details (e.g. subscription model) regarding the usage of certain enterprise services. Each time a backend system ("BS") 223 registers a service at the service registry, the BS may issue a Delegation Token to the security token service ("STS") 222 as illustrated at 201. The Delegation Token grants the STS the authority to delegate the encoded capabilities to eligible service consumers. In one embodiment, the Delegation Token is signed by the private key of the Backend System. Instead of issuing Delegation Tokens for individual Enterprise Services belonging to BS, the BS can also issue a collective Delegation Token which encodes a collection of registered Enterprise Services. An Enterprise Service may be uniquely identified by its URL, for example.

The Service Consumer's goal is to be able to access Enterprise Services provided by Backend Systems. For this purpose a Service Consumer 210 may be required to prove to a Backend System 223 (e.g., by presentation of certain electronic information) that the SC owns capabilities which authorize the SC to access the requested Enterprise Services. In one embodiment, this is accomplished by obtaining a License Token from a License Token Service 221 and then presenting the License Token to a Security Token Service 222 in order to obtain a service specific "Capability Token". For example, at 201, a BS 223 provides a STS 222 the ability to grant Capability Tokens that allow access to the BS's services. At 202 a SC 210 may apply for a License Token by sending a request to a LTS 221. The LTS 221 may authenticate the SC 210 and send a License Token to the SC at 203. At 204, the SC 210 may send a message to the STS 222 with the License Token and request access to a service on BS 223. At 205, a Capability Token may be sent to SC 210, which allows the SC to access the desired service on BS 223. At 206, SC 210 sends the Capability Token to the BS 223 to access the service. At 207, the service is provided to the SC, and at 208 information about the transaction may be forwarded to Metering and Billing Service 224. At 209, a message may be sent to the SC 210 concerning payment for the provided service.

Features and advantages of the present invention include security techniques and protocols that may used to ensure the integrity of one or more of the transactions describe above. For example, in one embodiment, a License Token may encapsulate a symmetric key (e.g., a Service Consumer session key) intended for secure communication between Service Consumer and Security Token Service when applying for service specific capability tokens. The License Token may also include other information such as Service Consumer's unique id, for example. The contents of the License Token may be encrypted with a symmetric key shared between the Security Token Service and the issuing License Token Service. The Capability Token may be used as a credential that the Service Consumer 210 uses to prove to Backend System 223 that Service Consumer 210 is eligible to access an Enterprise Service. In one embodiment, a Capability Token is a digitally signed credential (e.g., an asymmetrically encoded message) including a public key and conditional permission to access an Enterprise Service (e.g., within a given validity time period). The Service Consumer 210 may use a Capability Token and invoke Enterprise Services, which may be encoded in the SC's Capability Token. Upon receiving the Capability Token and other required data (e.g., such as an encrypted timestamp as an authenticator) from the Service Consumer 210, the Backend System 223 verifies the received Capability Token and the other data. If the BS 223 verifies the received information, the BS executes the requested Enterprise Service and sends the computed result back to the Service Consumer, for example. In one embodiment described below, any interaction between two principals is encrypted with the symmetric session keys shared between those principals. In one embodiment, the SC 210, LTS 221, STS 222, and BS 223 possess independent public/private key pairs. Additionally, the SC 210 and LTS 221 may hold public key certificates issued by certification authorities. These certificates may be used to verify the relationship (or binding) between the SC 210 and the SC's public key and the LTS 221 and the LTS's public key, for example.

Figure 3:
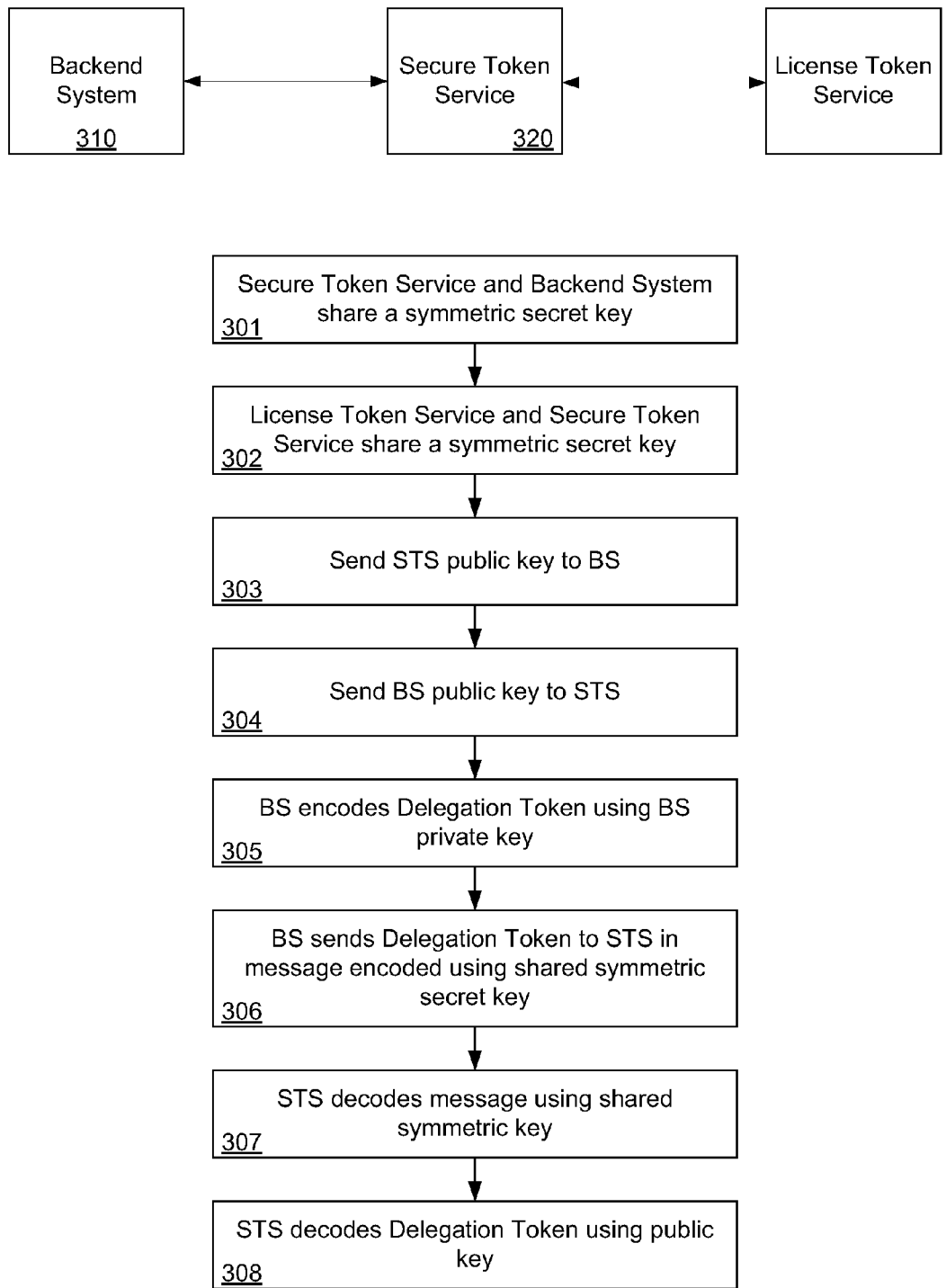
FIG. 3 shows an example secure transaction between a backend system hosting a software service and a security service component according to one embodiment of the present invention.

FIG. 3 shows an example secure transaction between a backend system hosting a software service and a security service component according to one embodiment of the present invention. At 301, a Backend System 310 and Secure Token Service component 320 may share a symmetric BS-STS secret key. At 302, a License Token Service 330 and the STS 320 may share a symmetric STS-STS secret key. At 303, a STS 320 may send its STS public key to the BS 310. Similarly, at 304, the BS 310 may send its BS public key to the STS 320. At 305, the BS encodes a Delegation Token using the BS private key. A Delegation Token may grant the holder (subject) of the token the authority to delegate the encoded capabilities (e.g., Capability Tokens) to eligible parties. A Delegation Token may be signed by the private key of the issuer (here, the BS). At 306, the BS 310 sends the Delegation Token to the STS 320 in a message encoded using the symmetric secret key shared by the BS and STS. At 307, the STS may decode the message using the shared symmetric key, and at 308 the STS may decode the delegation token using the public key of the BS to obtain the Delegation Token.

Figure 4:
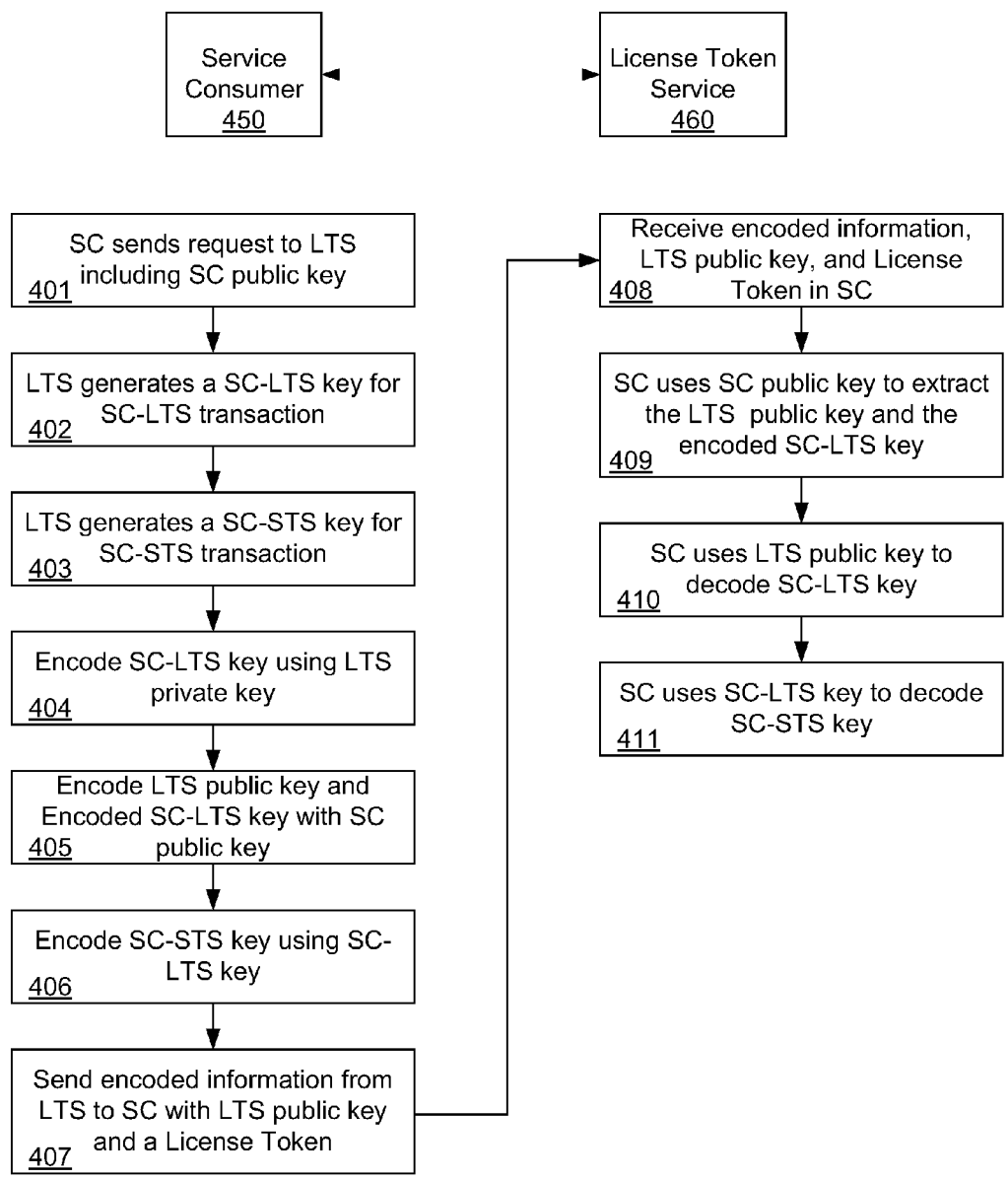
FIG. 4 shows an example secure transaction between a service consumer and a licensing component according to one embodiment of the present invention.

FIG. 4 shows an example secure transaction between a service consumer and a licensing component according to one embodiment of the present invention. At 401, the SC 450 sends a request to the LTS 460. The request includes the public key of the SC and may include other authorization information, for example. At 402, the LTS generates a SC-LTS key (e.g., a session key) that is shared between the SC and the LTS to support message confidentiality. At 403, the LTS generates a SC-STS key for use during transactions between the SC and STS. At 404, the SC-LTS key is encoded using the LTS private key. At 405, the LTS public key and the encoded SC-LTS key are encoded using the SC public key, which was received at step 401. The SC-STS key is encoded using the SC-LTS key at 406. At 407, the encoded information is sent from the LTS to the SC with the LTS public key and a License Token. The License Token may be encrypted with the symmetric key shared between the LTS and STS (see e.g., FIG. 3, at 302). The LTS may embed the SC-STS key in the LT for later use by the STS. At 408, the SC 450 receives the encoded information, the LTS public key, and the License Token. At 409, the SC uses the SC public key to extract the LTS public key and the encoded SC-LTS key. At 410, the SC uses the LTS public key to decode the SC-LTS key. At 411, the SC uses the SC-LTS key to decode the SC-STS key, which may be used during a transaction between the SC and an STS.

In one example embodiment described in more detail below, the SC sends a public key certificate signed by a party trusted by the SP. This public key certificate encodes a binding between the public key of the SC and its unique identifier (e.g. a name, or another identifier like email address, IP address). In most cases, a public key is sufficient since it is mathematically a unique identifier. The public key certificate states that that there is a verified binding between SC's identifier and the public key. The SC then signs a sequence (i.e. which consists of time stamp and nonce) using a private key which corresponds to his public key encoded in the public key certificate. Thus, the receiving party, SP, can check whether the signature has been created by using a private key which corresponds to the known public key. Although this exchange would be good enough for a correct identification of the SC, both parties have agreed on a nonce (e.g., nonce2) during the SLA phase (bootstrapping phase) and this nonce may be used to during the first communication. A timestamp and nonce show that the request was generated by the SC specifically for this request.

Figure 5:
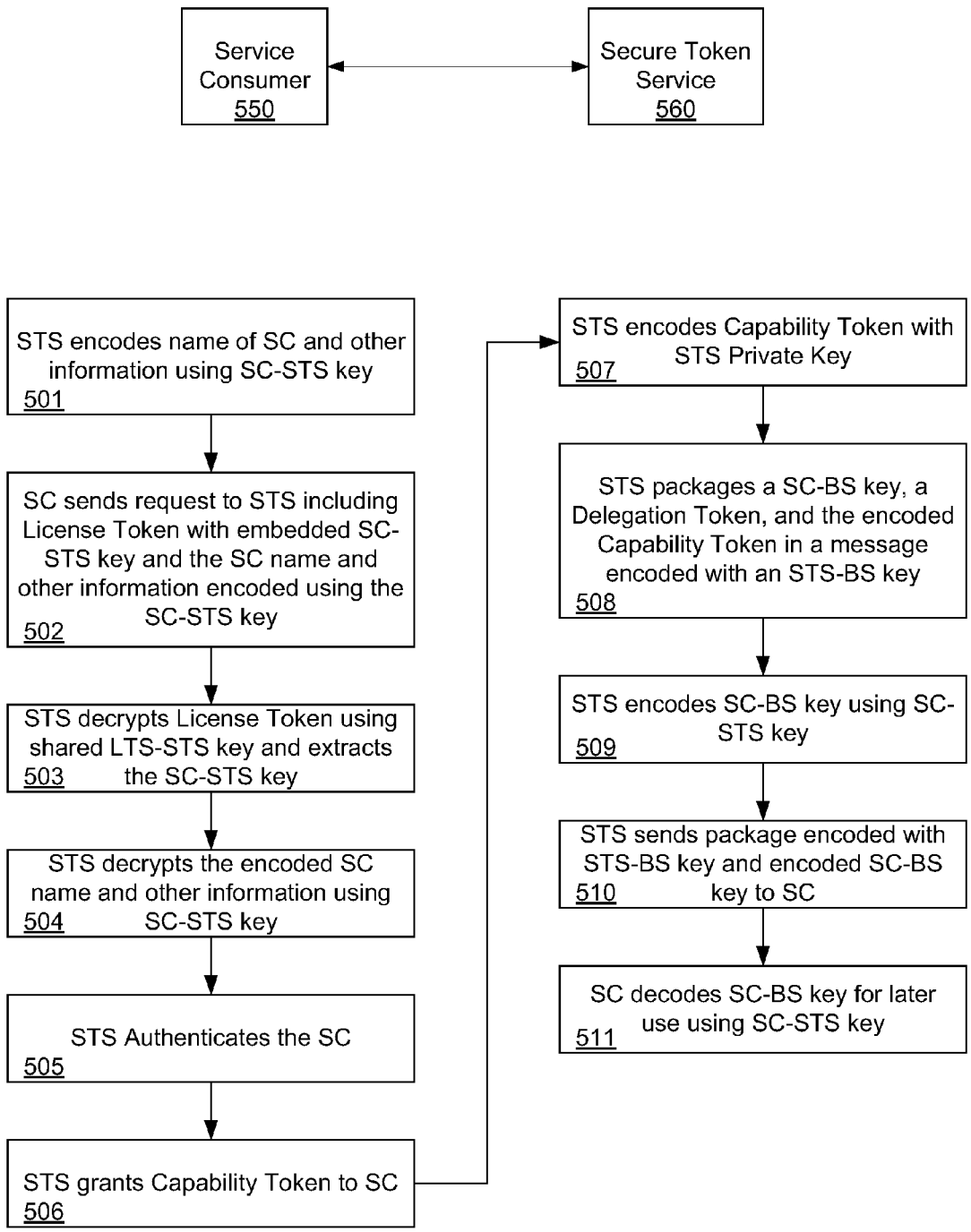
FIG. 5 shows an example secure transaction between a service consumer and a capability token component according to one embodiment of the present invention.

FIG. 5 shows an example secure transaction between a service consumer and a capability token component according to one embodiment of the present invention. At 501, the SC 550 uses the SC-STS key decoded at step 411 above to encode an identifier for the SC (e.g., the name of the SC) and other information that may be used for authentication purposes. The SC 550 then sends a request to the Secure Token Service (STS) 560 at 502. The request may include the License Token with the embedded SC-STS key and the encoded SC name and information from step 501, for example. At 503, the STS 560 receives the request and decrypts the License Token using the shared LTS-STS key described above and extracts the SC-STS key. At 504, the STS 560 decrypts the encoded SC name and other information. At 505, the STS 560 authenticates the SC 550. At 506, the STS 560 grants a Capability Token to the SC 550. At 507, the STS 560 encodes the Capability Token with a private key of the STS (the STS private key). At 508, the STS packages a SC-BS key, a Delegation Token, and the encoded Capability Token in a message encoded with an STS-BS key. At 509, the STS 560 encodes the SC-BS key using the SC-STS key. At 510, the STS 560 sends the encoded package from step 508 and the encoded SC-BS key to the SC 550. The SC 550 may now use the Capability Token to access services on a Backend System (BS). The SC 550 may also decode the SC-BS key for later use using the SC-STS key at 511.

Figure 6:
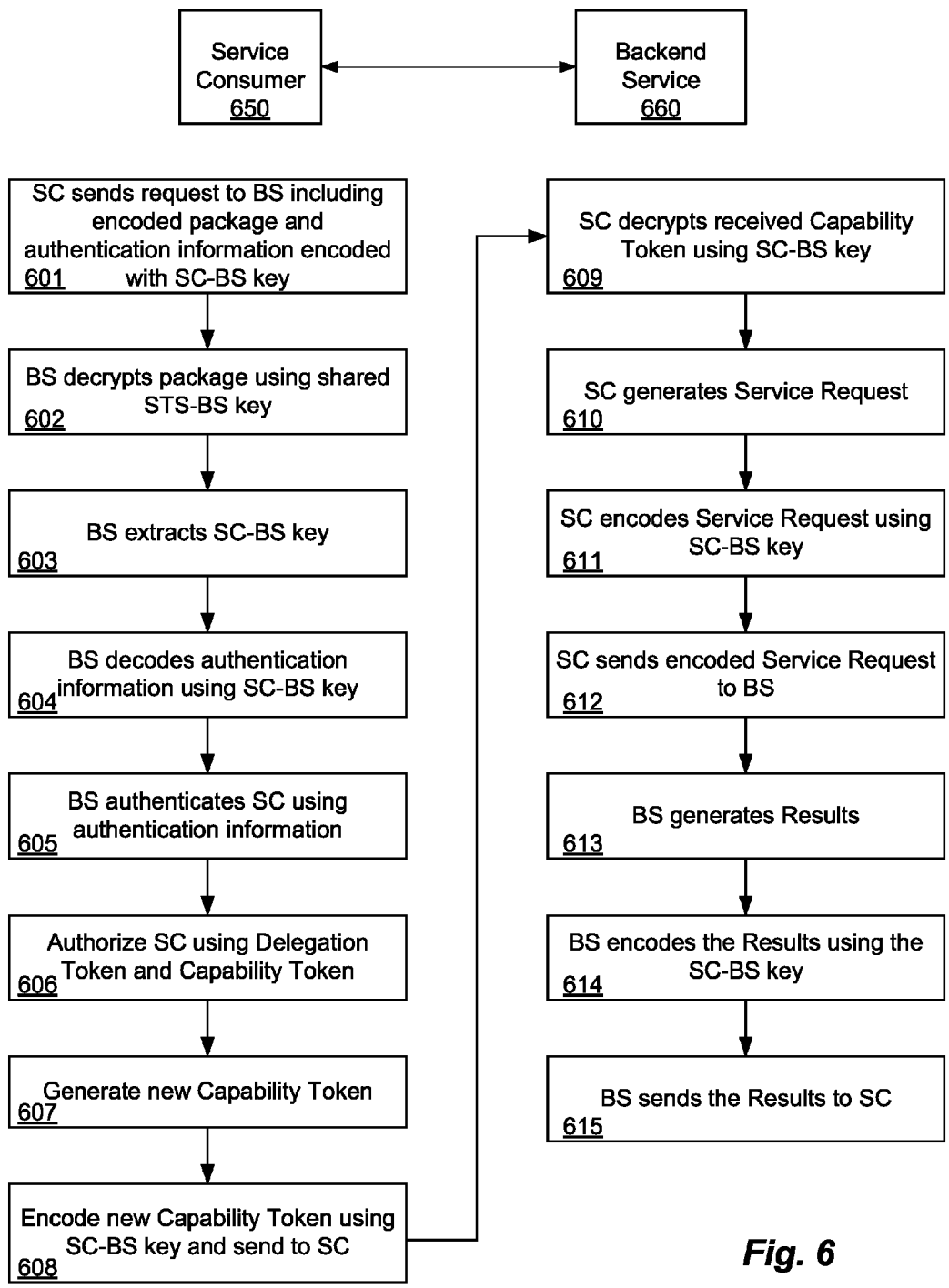
FIG. 6 shows an example secure transaction between a service consumer and a backend system component according to one embodiment of the present invention.

FIG. 6 shows an example secure transaction between a service consumer and a backend system component according to one embodiment of the present invention. At 601, the SC 650 sends a request to BS 660. The request may include the encoded package describe above, which includes the Delegation Token and Capability Token and which is encoded with a shared STS-BS key. The request may further include authentication information that is encoded using the SC-BS key. The BS 660 receives the request and decrypts the package using the shared STS-BS key at 602. At 603, BS 660 extracts the SC-BS key embedded in the request package. At 604, BS 660 may use the SC-BS key to decode the authentication information. At 605, BS 660 may authenticate the SC 650 using the authentication information. At 606, BS 660 may authorize the SC 650 using the Capability Token and Delegation Token. For example, a capability token may be signed with the private key of the BS by the BS and encoded (encrypted) with the SC-BC symmetric key. Accordingly, the BS 660 may check to verify that the Delegation Token was issued by itself to the STS that issued the Capability Token. If the chain of tokens is verified, then a new Capability Token may be generated at 607. The Capability Token sent back to SC 650 may include an identification of the service to be accessed and used by the SC. The Capability Token may be encoded using the SC-BS key and sent to the SC 650 at 608. At 609, the Capability Token may be decrypted by the SC 650 using the shared SC-BS key. At 610, the SC may generate a Service Request. At 611, the service request may be encoded using the SC-BS key. At 612, the SC 650 sends the encoded Service Request to BS 660. The BS 660 processes the Request using a software service and generates Results at 613. At 614, the BS 660 encodes the Results using the SC-BS key and sends the Results to the SC 650 at 615.

Figure 7:
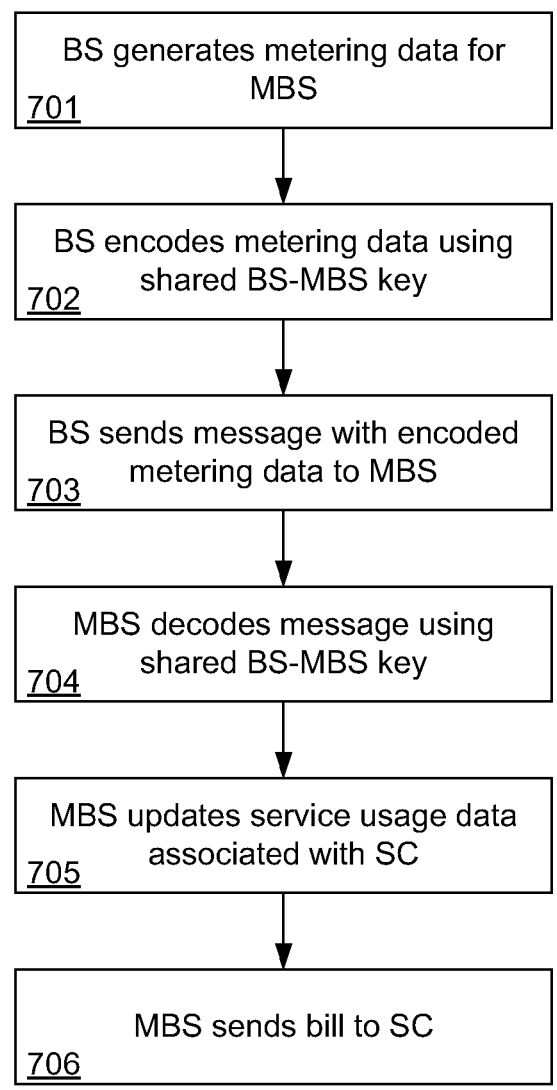
FIG. 7 shows an example secure transaction between a backend service and a metering component according to one embodiment of the present invention.

FIG. 7 shows an example secure transaction between a backend service and a metering component according to one embodiment of the present invention. At 701, the BS 750 generates metering data for a Metering and Billing Service ("MBS") 760. Metering data may include an identification of the Service Consumer that used a Backend Service, licensing information, and an identification of the service used, for example. At 702, the BS encodes the metering data using a shared BS-MBS key. The BS sends a message with the encoded metering data to the MBS at 703. At 704, the MBS decodes the message using the shared BS-MBS key and extracts the metering data. The MBS updates service usage data associated with the SC (e.g., in a data repository) at 705. At 706, the MBS sends the SC a bill, which may also be encoded, for example.

EXAMPLE

In the following section, a specific implementation example combining the various techniques described above is disclosed. For the purposes of this example, the following terminology may be helpful, but not limiting, in understanding the specific example embodiment disclosed. Unless otherwise stated, the following definitions are not to be used to limit or define the terms in the claims, but rather, may be used to provide specific examples of some of the terms used in the claims below.

A nonce stands for a number used once. It may be a random or pseudo-random number issued in an authentication protocol to ensure that old communications cannot be reused in replay attacks.

Advanced Encryption Standard (AES)—A block cipher adopted as a symmetric encryption standard by the U.S. government.

Capability—A capability (known in some systems as a key) is a communicable, unforgeable token of authority. It refers to a value that references an object along with an associated set of access rights. A service consumer may use a capability to access an Enterprise Service provided by a service provider.

Capability Token (CT)—A Capability Token is a digitally signed credential containing authorization information to access an Enterprise Service (e.g., within a given validity period).

Configuration Service (CS)—A software component which may be used to configure contracts, tariff plans, and pricing rules. The CS may be used by the Service Level Agreement (SLA) administrator.

Delegation Token (DT)—A Delegation Token grants the holder (subject) of the token the authority to delegate the encoded capabilities to eligible parties. A DT may be signed by the private key of the issuer.

Enterprise Service (ES)—An example enterprise service is a series of Web services combined with business logic that can be accessed and used repeatedly to support a particular business process.

License Token (LT)—An example License Token may encapsulates a symmetric key (service consumer session key) intended for secure communication between service consumer and Security Token Service when applying for service specific capability tokens. The License Token may also include other information such as service consumer's unique id. The contents of the License Token may be encrypted with a symmetric key shared between the Security Token Service and the issuing License Token Service.

License Token Service (LTS)—An software component which may provide functionality for issuance and validation of cryptographic License Tokens (LT).

Metering and Billing Service (MBS)—An software component which calculates charges for service accesses and may associate each charge with a customer account.

Public Key Cryptography—Public-key cryptography, also known as asymmetric cryptography, is a form of cryptography in which a user has a pair of cryptographic keys—a public key and a private key. The private key is kept secret, while the public key may be widely distributed. A message encrypted with the public key can be decrypted only with the corresponding private key.

Symmetric Cryptography—Symmetric, or secret key, is where the same key is used both to encrypt and to decrypt the subject matter involved. It involves the use of a secret key known only to the participants of the secure communication: If Alice wants to send the message m securely over a public channel to Bob, they first agree on a secret key SecKA-B which is shared by Alice and Bob. Alice then uses the key SecKA-B to encrypt the message m and sends the encrytped message {m}SecKP1-P2 to Bob. He will decrypt the received ciphertext with the same key to gain access to the message. Symmetric cryptography can be used to transmit information over an insecure channel as above, but it has also other uses, such as secure storage on insecure media or strong mutual authentication.

Session Key—A session key may be a one-off symmetric key used for encrypting one message or a group of messages in a communication session.

Security Token Service (STS)—It is a software component which provides functionality for issuance, exchange, and validation of cryptographic tokens. A service consumer sends an authentication request, with accompanying a License Token (LT), to the STS. The STS verifies the LT presented by the service consumer, and then in response, it issues a Capability Token (CT) that provides proof that the service consumer has authenticated with the STS and eligible for the granted capability. The service consumer presents the CT to the service provider. The service provider verifies that the token was issued by a trusted STS, which proves that the client has successfully authenticated with the STS and is authorized to access an Enterprise Service contained in the Capability Token.

Notation:
Principals
  SC: Service Consumer
  SC: The id of the Service Consumer
  SP: Service Provider
  SR: Service Registry
  LTS: License Token Service
  LTS: The id of the License Token Service
  STS: Security Token Service
  STS: The id of the Security Token Service
  BS: Backend System
  BS: The id of the Backend System
  ES: Enterprise Service
  ES: The id of the requested Enterprise Service
  CA: Certification Authority
  CA: The id of the Certification Authority
  MBS: Service Metering and Billing Service
LT: License Token
LN: Unique Service Consumer License Number
CT: Capability Token
DT: Delegation Token
(PubKP, PrivKP): Public/Private key pair of the principal P
PubKCertP: Public key certificate of the principal P.
SecKP1-P2: Symmetric key shared by the principals P1 and P2
{m}SecKP1-P2: The encryption of message m with symmetric key SecKP1-P2 which is shared by the principals P1 and P2.
{{m}}PubKP: The encryption of message m with public key PubKP
  [m]PrivKP: The digital signature of message m with private key PrivKP which belongs to principal P.

In the following example protocol, SC, LTS, STS and BS possess independent public/private key pairs, (PubKSC, PrivKSC), (PubKLTS, PrivKLTS), (PubKSTS, PrivKSTS), and (PubKBS, PrivKBS), respectively. In this example, the principals SC and LTS may hold public key certificates PubKCertSC and PubKCertLTS issued by certification authorities CA1 and CA2, respectively. These certificates may be used to testify the binding between each principal (i.e. SC and LTS) and its purported public key. In this example protocol, the digital signatures may be effectively unforgeable.

Additionally, for this example the LTS and STS exchange and share a symmetric secret key. Similarly, the STS and each BS exchange and share a symmetric secret key, and exchanged each other's public keys over a secure channel. The LTS, STS and BSs may be hosted in the same SP's security infrastructure. Accordingly, there is symmetric key distribution infrastructure within this security infrastructure to ensure the integrity of the keys.

Capability Delegation Phase

Figure 8:
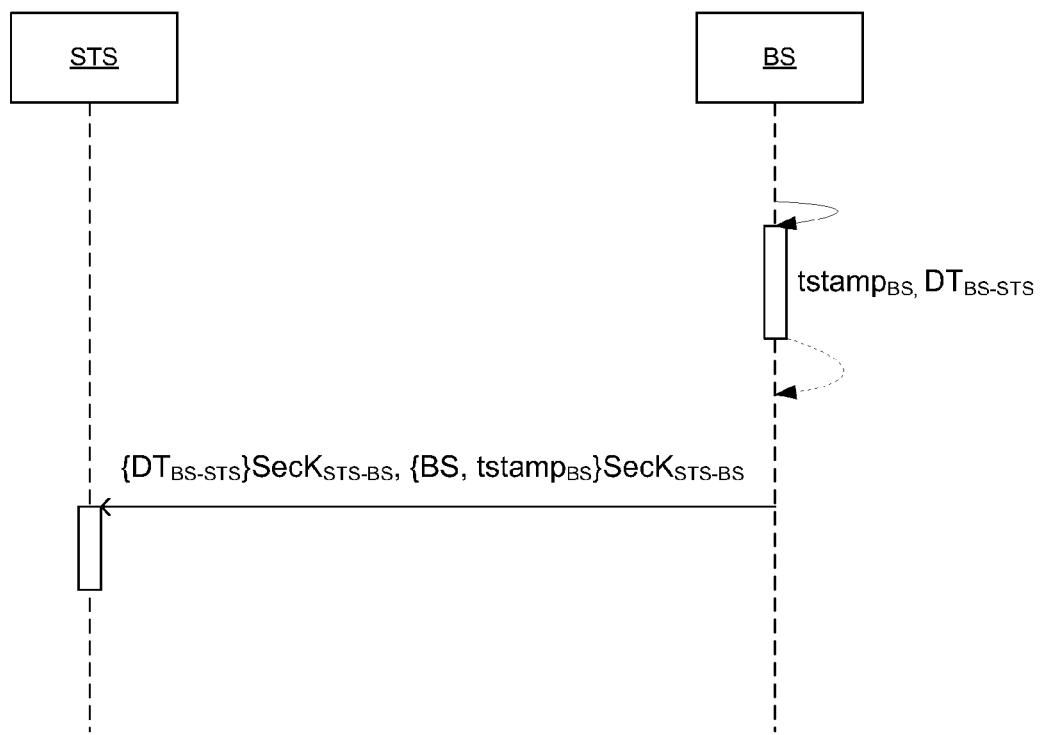
FIG. 8 illustrates the capability delegation phase according to one embodiment of the present invention.

FIG. 8 illustrates the capability delegation phase. In this phase, the BS grants a delegation token to the STS, the content of which means "the STS can speak for the issuing BS," where the BS is the owner of the Enterprise Service. As mentioned above, the STS and BS have already exchanged each other's public key over a secure channel. The backend system BS generates a timestamp "tstampBS" with a local clock and issues a delegation token $DT_{BS\text{-}STS}$ to the STS. The timestamp helps to protect against replay attacks. The BS encrypts the sequence of the BS's id, "BS", and "tstampBS" with the symmetric key $SecK_{STS\text{-}BS}$ shared between STS and BS. This sequence will be used as authenticator by the STS. The BS also encrypts the delegation token with $SecK_{STS\text{-}BS}$. The BS then sends both encrypted message parts to the STS. The delegation token $DT_{BS\text{-}STS}$ is signed by BS's private key PrivKBS and includes the following fields:

Issuer: The BS public key PubKBS that is delegating the authority to grant authorization to eligible service consumers.

Holder: The STS public key PubKSTS that is receiving the authority to grant authorization to eligible service consumers.

Capabilities: A set of unique identifiers, each of which represents the unique address (e.g. URL) of an Enterprise Service whose implementation is hosted by the backend system.

Validity: A time period during which the holder is allowed to grant authorizations to eligible service consumers.

Authentication & License Token Request Phase and Delivery Phase

Figure 9:
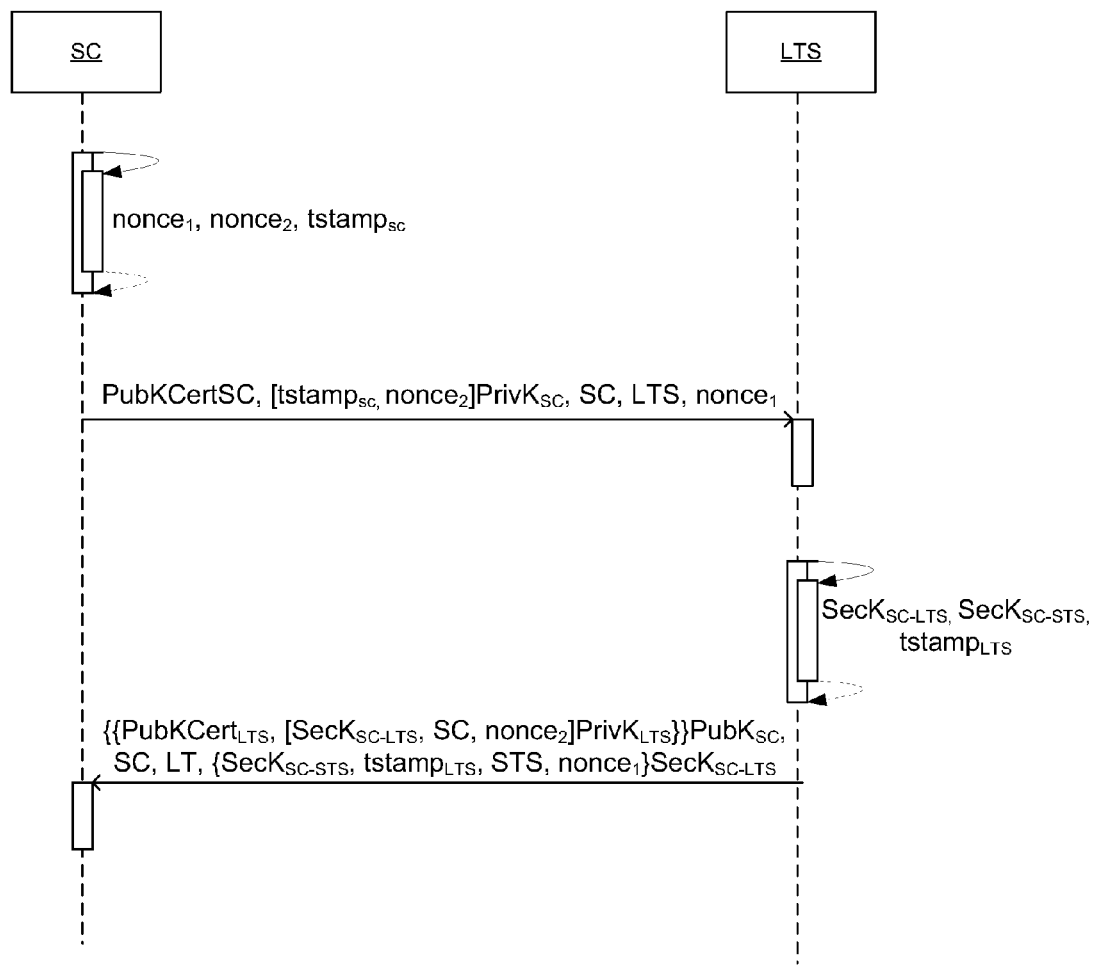
FIG. 9 illustrates the authentication and license token request phase and delivery phase according to one embodiment of the present invention.

FIG. 9 illustrates the authentication and license token request phase and delivery phase. In this phase, the principals SC and LTS perform following steps. First, the service consumer SC generates two nonces "$nonce_1$," "$nonce_2$" and a timestamp "$tstamp_{SC}$." Next, the SC sends a request as follows:

<$PubKCert_{SC}$, [$tstamp_{SC}$, $nonce_2$]$PrivK_{SC}$, SC, LTS, $nonce_1$>

The request is sent to the LTS and the SC thereby applies for a License Token LT. The request includes following parts:

$PubKCert_{SC}$: SC's public key certificate

[$tstamp_{SC}$, $nonce_2$]$PrivK_{SC}$: SC's local time $tstamp_{SC}$ and a nonce $nonce_2$, signed by SC's private key $PrivK_{SC}$.

SC: SC's id.

LTS: LTS's id.

$nonce_1$: a nonce generated by SC.

The LTS receives the request and responds by generating a fresh key "$SecK_{SC\text{-}LTS}$" for use between SC and LTS, a second fresh key "$SecK_{SC\text{-}STS}$" for use between SC and STS, and a timestamp "$tstamp_{LTS}$" containing LTS's local time. The LTS then sends the following response to SC:

<{{$PubKCert_{LTS}$, [$SecK_{SC\text{-}LTS}$, SC, $nonce_2$]$PrivK_{LTS}$}$PubK_{SC}$, SC, LT, {$SecK_{SC\text{-}STS}$, $tstamp_{LTS}$, STS, $nonce_1$}$SecK_{SC\text{-}LTS}$>.

The response includes following parts:
(1) {{$PubKCert_{LTS}$, [$SecK_{SC\text{-}LTS}$, SC, $nonce_2$] $PrivK_{LTS}$}}$PubK_{SC}$.
(2) SC: SC's name.
(3) LT.
(4) {$SecK_{SC\text{-}STS}$, $tstamp_{LTS}$, STS, $nonce_1$}$SecK_{SC\text{-}LTS}$.

With regard to the first part of the response at (1) above, the LTS builds the sequence "$SecK_{SC\text{-}LTS}$," "SC," and "$nonce_2$" and signs this sequence with the LTS private key "$PrivK_{LTS}$." The presence of this nonce uniquely identifies which of the possibly several requests of SC this response corresponds to. The LTS includes this encrypted sequence in a message together with the LTS's public key certificate "$PubKCert_{LTS}$," and then encrypts the message with the public key of SC. This part of LTS's response guarantees integrity protection as SC's name "SC" and "$nonce_2$"(which was generated by SC) appears inside a component signed by LTS. This may defend against a man-in-the-middle attack since SC can verify that the LTS generated the received License Token for the SC and not for another principal. The presence of the nonce "$nonce_2$" uniquely identifies which of the requests of the SC this reply corresponds to. Alternatively, the LTS could have also included "$nonce_1$" from the SC in the signed sequence.

With regard to the second part of the response at (2) above, the License Token issued by LTS for the SC is encrypted with a long-term symmetric key "$SecK_{LTS\text{-}STS}$" shared between LTS and STS. The License Token "LT" contains SC's id (name) "SC," the SC's network address, the SC's unique license number, a service subscription type (e.g. annual, monthly, one-time), license validity period, and the SC-STS session key "$SecK_{SC\text{-}STS}$."

With regard to the third part of the response at (3) above, this part contains the session key "$SecK_{SC\text{-}STS}$" for use between SC and STS, the LTS's local time "$tstamp_{LTS}$," the name of the token service "STS," and "$nonce_1$" generated by the SC. This component of the response is encrypted with the symmetric key "$SecK_{SC\text{-}LTS}$" shared between SC and LTS for message confidentiality.

Capability Token Request and Delivery Phase

Figure 10:
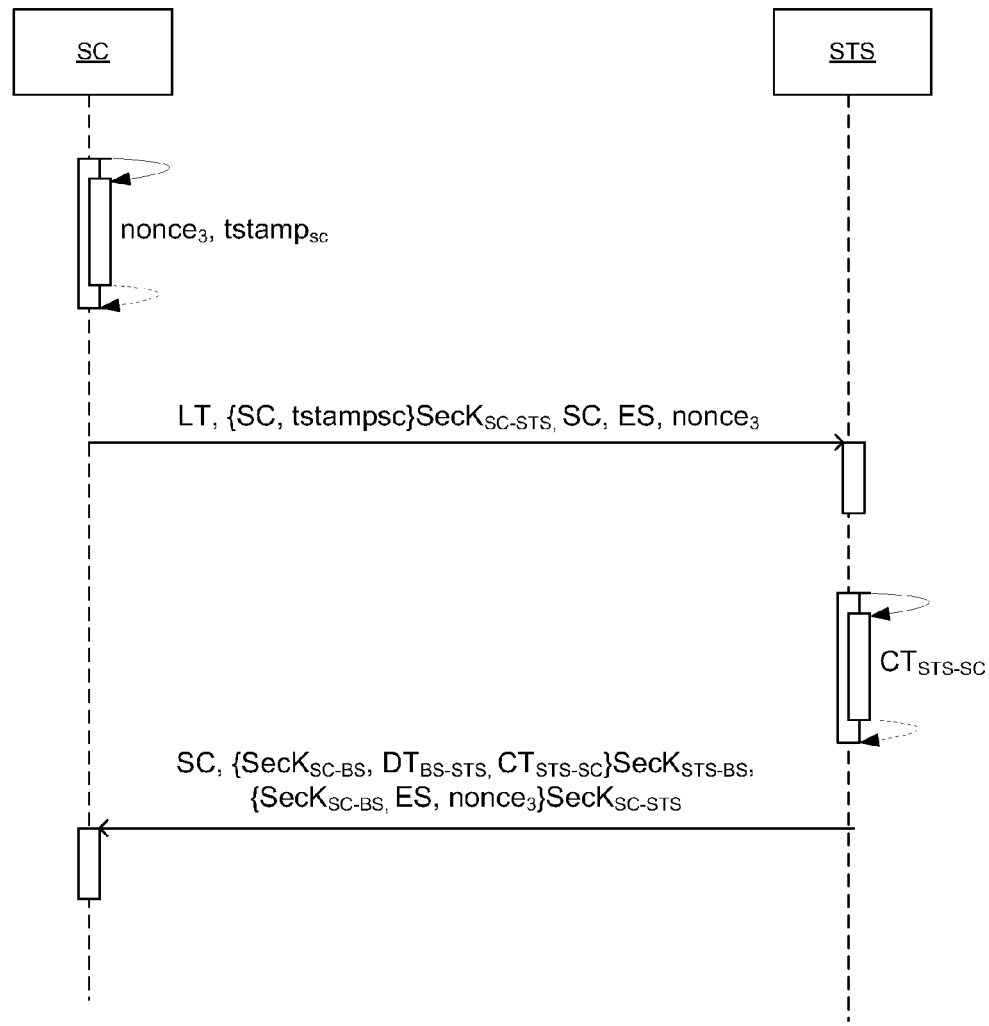
FIG. 10 illustrates the capability token request and delivery phase according to one embodiment of the present invention.

FIG. 10 illustrates the capability token request and delivery phase. In these phases, the principals SC and STS perform following steps. The service consumer SC browses the Service Registry and retrieves the URL of the Enterprise Service, represented by "ES." The service consumer SC generates a nonce "$nonce_3$" and a timestamp "$tstamp_{SC}$." The SC sends the following request to the STS and applies for a Capability Token, which grants the SC the authorization to invoke an Enterprise Service represented by "ES":

<LT, {SC, $tstamp_{SC}$}$SecK_{SC\text{-}STS}$, SC, ES, $nonce_3$>

The SC's request is composed of following parts:
LT: the SC's License Token issued by LTS.
{SC, $tstamp_{SC}$}$SecK_{SC\text{-}STS}$: SC's name "SC" and local time "$tstamp_{SC}$" encrypted with the session key "$SecK_{SC\text{-}STS}$."
SC: the SC's name.
ES: the id of the requested Enterprise Service.
$nonce_3$: a nonce generated by SC.

Upon receiving SC's request, the STS decrypts the "LT" using the shared "$SecK_{LTS\text{-}STS}$" secret key. This gives the STS the SC-STS session key "$SecK_{SC\text{-}STS}$." Using this key the STS decrypts the message part "{SC, $tstamp_{SC}$}$SecK_{SC\text{-}STS}$" and retrieves the combination of "SC" and "$tstamp_{SC}$," which is the authenticator part of the SC's request. The STS grants a Capability Token "$CT_{STS\text{-}SC}$." The STS then sends the following response to the SC:

<SC, {$SecK_{SC\text{-}BS}$, $DT_{BS\text{-}STS}$, $CT_{STS\text{-}SC}$}$SecK_{STS\text{-}BS}$, {$SecK_{SC\text{-}BS}$, ES, $nonce_3$}$SecK_{SC\text{-}STS}$>.

This response is composed of the following message parts:
(1) SC: SC's id.
(2) {$SecK_{SC\text{-}BS}$, $DT_{BS\text{-}STS}$, $CT_{STS\text{-}SC}$}$SecK_{STS\text{-}BS}$.
(3) {$SecK_{SC\text{-}BS}$, ES, $nonce_3$}$SecK_{SC\text{-}STS}$.

With regard to the second part of the response at (2) above, this part contains the SC-BS session key "$SecK_{SC\text{-}BS}$," a Capability Token, and a Delegation Token. The Capability Token and Delegation Token are encrypted with the symmetric key $SecK_{STS\text{-}BS}$ shared between STS and BS. The Capability Token "$CT_{STS\text{-}SC}$" expresses a permission (or a conditional permission) to access an enterprise service. The "$CT_{STS\text{-}SC}$" is signed by the STS using "$PrivK_{STS}$" and includes following fields:

Issuer: The public key $PubK_{STS}$ of the issuing STS.
Holder: The public key $PubK_{SC}$ of the SC (which now acts as the holder of the capability).

Capabilities: The id ES of the granted enterprise service.
Validity period: A time period during which the holder is allowed to access the granted enterprise service.
Service Consumer Id: The id of the SC.
Service Consumer network address: The network address of the SC.
Service Consumer license number: The unique service consumer license number LN.

With regard to the third part of the response at (3) above, this part contains the SC-BS session key, the id of the granted Enterprise Service and a nonce. This component of the response is encrypted with the session key "$SecK_{SC\text{-}STS}$."

Enteprise Service Request Phase and Service Result Delivery Phase

Figure 11:
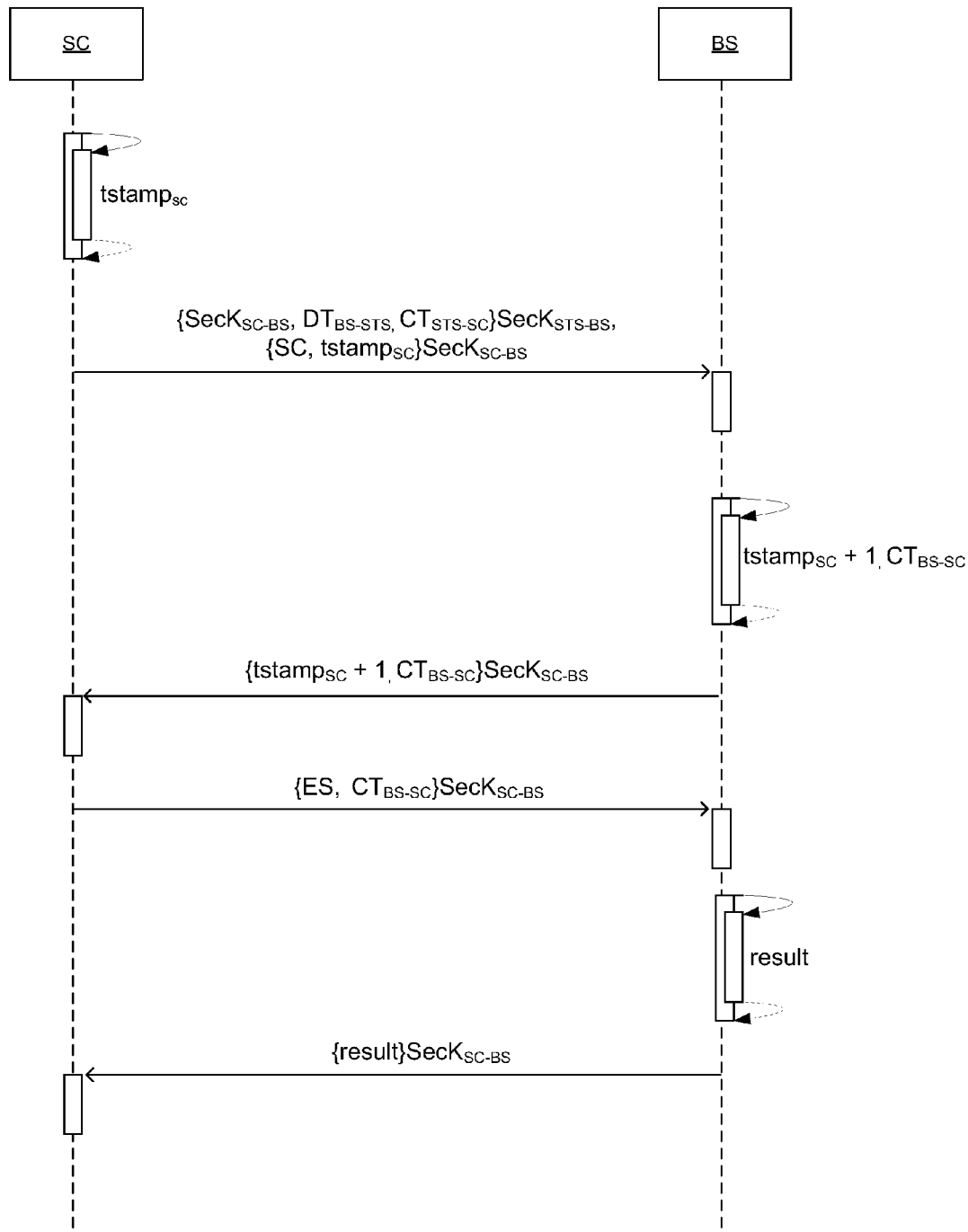
FIG. 11 illustrates the service request and result delivery phases according to one embodiment of the present invention.

FIG. 11 illustrates the service request and result delivery phases. Upon receiving the response in the capability token delivery phase, the SC has now enough information to authenticate itself to a BS and prove that it holds a capability that authorizes it to access an enterprise service. In this phase, the SC and BS perform following steps. First, the service consumer SC generates a timestamp "$tstamp_{SC}$." The SC then sends the following request to BS:

<{$SecK_{SC\text{-}BS}$, $DT_{BS\text{-}STS}$, $CT_{STS\text{-}SC}$}$SecK_{STS\text{-}BS}$, {SC, $tstamp_{SC}$}$SecK_{SC\text{-}BS}$>.

The first part of the message is from the previous phase and contains the SC-BS session key "$SecK_{SC\text{-}BS}$," the Delegation Token "$DT_{BS\text{-}STS}$" and the Capability Token "$CT_{STS\text{-}SC}$." This portion of the message was encrypted with the symmetric key "$SecK_{STS\text{-}BS}$", which is shared between STS and BS. The second part of the message is an authenticator which contains SC's id "SC" and a timestamp "$tstamp_{SC}$." The second part of the message is encrypted with the session key "$SecK_{SC\text{-}BS}$." The BS decrypts the first part of the message using the symmetric key "$SecK_{STS\text{-}BS}$" to retrieve the SC-BS session key "$SecK_{SC\text{-}BS}$," the delegation token "$DT_{BS\text{-}STS}$" and the capability token "$CT_{STS\text{-}SC}$." The BS verifies the request's "proof of authenticity" and "proof of authorization" in order to determine whether the SC's request for a protected enterprise service should be honored. The proof of authenticity is the authenticator which contains the SC's id "SC" and a timestamp "$stamp_{SC}$" encrypted with the session key $SecK_{SC\text{-}BS}$ (i.e., the second part of the message above). The proof of authorization is a token chain that consists of the "$DT_{BS\text{-}STS}$" and "$CT_{STS\text{-}SC}$." To verify the proof of authorization, the BS checks whether the token chain constitutes a chain of authorization originating from the BS itself. For this purpose, the BS performs following steps: (1) the BS verifies the signature and validity period of the Delegation Token; (2) after a positive evaluation of the Delegation Token, the BS then checks whether $CT_{STS\text{-}SC}$ is signed by an issuer who is also the holder of the $DT_{BS\text{-}STS}$; (3) in the positive case the BS checks whether the capability "to invoke the enterprise service ES" is included in the capabilities encoded in the delegation token $DT_{BS\text{-}STS}$ and whether the validity period in the capability token $CT_{STS\text{-}SC}$ is within the range of the validity period contained in the delegation token; (4) in the positive case the BS issues a new capability token $CT_{BS\text{-}SC}$ signed by the private key $PrivK_{BS}$ of the BS. The new capability token includes following fields:

Issuer: The public key $PubK_{BS}$ of the BS
Holder: The public key $PubK_{SC}$ of the SC
Capabilities: The id ES of the granted enterprise service. This is calculated by computing the intersection of the capabilities included in the delegation token and the capabilities contained in the previous capability token $CT_{STS\text{-}SC}$.
Validity period: A time period during which the holder is allowed to access the granted enterprise service. This validity period is calculated by computing the intersection of validity periods contained in the delegation token and the validity period contained in the previous capability token $CT_{STS\text{-}SC}$.
Delegation bit: If this bit is set to true, this means that the Service Consumer is authorized to delegate the encoded capabilities to another principal. Otherwise, the Capability Token can only be used by the Service Consumer which possesses the private key corresponding to the encoded public key $PubK_{SC}$. The default value of this bit is false.

The BS sends the new capability token $CT_{BS\text{-}SC}$ and the timestamp $tstamp_{SC}$ found in the SC's authenticator plus 1, encrypted with the session key $SecK_{SC\text{-}BS}$. With this response the BS grants authorization via capability token $CT_{BS\text{-}SC}$, confirms its true identity and willingness to serve the SC.

The SC decrypts the capability token $CT_{BS\text{-}SC}$ and confirmation (e.g., the timestamp+1) using the SC-BS session key $SecK_{SC\text{-}BS}$ and checks whether the timestamp $tstamp_{SC}$ is correctly updated. If so, then the SC can trust the BS and can start submitting services requests to the BS, where each service request contains the id of the requested enterprise service and the corresponding capability token, encrypted with the session key $SecK_{SC\text{-}BS}$. Upon receiving the service request, the BS decrypts the request by using the shared session key and verifies the included capability token. In the positive case, the BS executes the requested enterprise service (i.e., operation). The BS encrypts the result with the SC-BS session key and returns the encrypted message to SC.

Service Metering Phase

Figure 12:
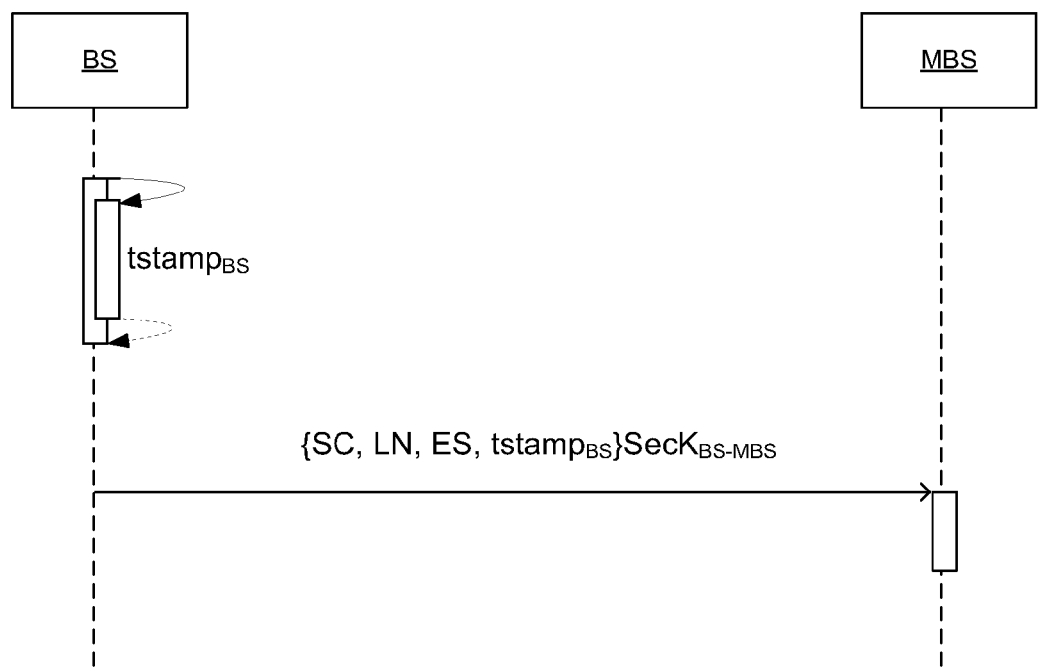
FIG. 12 illustrates the service request and result delivery phases according to one embodiment of the present invention.

FIG. 12 illustrates the service request and result delivery phases. Upon successful submission of the computed service result in the previous phase, the BS informs the Metering & Billing Service (MBS) about the consumption of the Enterprise Service "ES" by the Service Consumer "SC." For this purpose, the BS sends the following message to the MBS:

<{SC, LN, ES, $tstamp_{BS}$}$SecK_{BS\text{-}MBS}$>.

The message contains the id of the Service Consumer, the SC's license number, the id of the consumed Enterprise Service, and BS's local time. The message is encrypted with the long-term symmetric key $SecK_{BS\text{-}MBS}$ shared between BS and MBS. Upon receiving the message, the MBS decrypts the message and checks the timestamp. The MBS then updates its records about the usage of the service by the given Service Consumer. Depending on the agreed service subscription type (e.g. monthly, annual), the MBS sends a bill to the SC and asks it to pay for the consumed Enterprise Service.

FIG. 13 illustrates an example computer system coupled to a network that may be used to implement embodiments of the present invention. Computer system 1310 includes a bus 1305 or other communication mechanism for communicating information, and a processor 1301 coupled with bus 1305 for processing information. Computer system 1310 also includes a memory 1302 coupled to bus 1305 for storing information and instructions to be executed by processor 1301, including information and instructions for performing the techniques described above, for example. This memory may also be used for storing variables or other intermediate information during execution of instructions to be executed by processor 1301. Possible implementations of this memory may be, but are not limited to, random access memory (RAM), read only memory (ROM), or both. A storage device 1303 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 1303 may include source code, binary code, or software files for performing the techniques or embodying the constructs above, for example.

Computer system 1310 may be coupled via bus 1305 to a display 1312, such as a cathode ray tube (CRT) or liquid crystal display (LCD), for displaying information to a computer user. An input device 1311 such as a keyboard and/or mouse is coupled to bus 1305 for communicating information and command selections from the user to processor 1301. The combination of these components allows the user to communicate with the system. In some systems, bus 1305 may be divided into multiple specialized buses.

Computer system 1310 also includes a network interface 1304 coupled with bus 1305. Network interface 1304 may provide two-way data communication between computer system 1310 and the local network 1320. The network interface 1304 may be a digital subscriber line (DSL) or a modem to provide data communication connection over a telephone line, for example. Another example of the network interface is a local area network (LAN) card to provide a data communication connection to a compatible LAN. Wireless links is also another example. In any such implementation, network interface 1304 sends and receives electrical, electromagnetic, or optical signals that carry digital data streams representing various types of information.

Computer system 1310 can send and receive information, including messages or other interface actions, through the network interface 1304 to an Intranet or the Internet 1330. In the Internet example, software components or services may reside on multiple different computer systems 1310 or servers 1331-1335 across the network. The processes described above may be implemented on one or more servers, for example. A server 1331 may transmit actions or messages from one component, through Internet 1330, local network 1320, and network interface 1304 to a component on computer system 1310. Security processes may be implemented on any computer system and send and/or receive information across a network, for example. In one embodiment, the security techniques describe above may be implemented by software services one one or more servers 1331-1335, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method of performing a secure software service transaction comprising:
    performing a first transaction between a software service consumer and a license token service, the first transaction comprising:
        receiving, on at least one computer system executing the license token service, a license token request from the software service consumer, and
        sending, by the at least one computer system executing the license token service, a license token to the software service consumer in response to the license token request, wherein the license token is encrypted by a key shared between the license token service and a security token service;
    performing a second transaction between the software service consumer and the security token service, the second transaction comprising:
        receiving, on at least one computer system executing the security token service, a capability token request from the software service consumer, the capability token request including the encrypted license token and identifying one or more particular software services to be accessed on a backend system,
        decrypting, by the at least one computer system executing the security token service, the encrypted license token with the key shared between the license token service and a security token service, and
        sending, by the at least one computer system executing the security token service, a capability token to the software service consumer in response to the capability token request, wherein the capability token is encrypted by a key shared between the security token service and the backend system, the capability token including information identifying the one or more particular software services to be accessed on the backend system;
    performing a third transaction between the software service consumer and the backend system, the third transaction comprising:
        receiving, on at least one computer system executing the backend system, a service request from the software service consumer, the service request including the encrypted capability token,
        decrypting, by the at least one computer system executing the backend system, the capability token with the key shared between the security token service and the backend system,
        generating, by the at least one computer system executing the backend system, a new capability token including information identifying the one or more particular software services to be accessed on the backend system,
        sending, by the at least one computer system executing the backend system, the new capability token to the software service consumer,
        receiving, on the at least one computer system executing the backend system, a service request from the software service consumer comprising the new capability token and an identification of the one or more particular software services to be accessed on the backend system, and
        executing, by the at least one computer system executing the backend system, the service request on the one or more particular software services to be accessed on the backend system.

2. The method of claim 1 further comprising a fourth transaction, prior to the first transaction, wherein the security token service and the license token service share the key used to encrypt and decrypt the license token.

3. The method of claim 1 further comprising a fourth transaction, prior to the first transaction, wherein the security token service and the backend system share the key used to encrypt and decrypt the capability token.

4. The method of claim 1 further comprising a fourth transaction, prior to the first transaction, wherein the backend system provides the security token service the ability to grant capability tokens.

5. The method of claim 1 further comprising:
- receiving a delegation token in the security token service from the backend system;
- sending, with the capability token during the second transaction, the delegation token from the security token service to the software service consumer; and
- receiving, with the capability token during the third transaction, the delegation token from the software service consumer in the backend system; and
- verifying that the delegation token was issued by the backend system to the security token service.

6. A system for performing a secure software service transaction comprising:
- one or more processors; and
- a memory comprising processor readable instructions, which when executed by the processor perform the steps of:
  - performing a first transaction between a software service consumer and a license token service, the first transaction comprising:
    - receiving a license token request from the software service consumer, and
    - sending a license token to the software service consumer in response to the license token request, wherein the license token is encrypted by a key shared between the license token service and a security token service;
  - performing a second transaction between the software service consumer and the security token service, the second transaction comprising:
    - receiving a capability token request from the software service consumer, the capability token request including the encrypted license token and identifying one or more particular software services to be accessed on a backend system,
    - decrypting the encrypted license token with the key shared between the license token service and a security token service, and
    - sending a capability token to the software service consumer in response to the capability token request, wherein the capability token is encrypted by a key shared between the security token service and the backend system, the capability token including information identifying the one or more particular software services to be accessed on the backend system;
  - performing a third transaction between the software service consumer and the backend system, the third transaction comprising:
    - receiving a service request from the software service consumer, the service request including the encrypted capability token,
    - decrypting the capability token with the key shared between the security token service and the backend system,
    - generating a new capability token including information identifying the one or more particular software services to be accessed on the backend system,
    - sending the new capability token to the software service consumer,
    - receiving a service request from the software service consumer comprising the new capability token and an identification of the one or more particular software services to be accessed on the backend system, and
    - executing the service request on the one or more particular software services to be accessed on the backend system.

7. The system of claim 6 wherein the instructions, when executed by the processor, further perform a fourth transaction, prior to the first transaction, wherein the security token service and the license token service share the key used to encrypt and decrypt the license token.

8. The system of claim 6 wherein the instructions, when executed by the processor, further perform a fourth transaction, prior to the first transaction, wherein the security token service and the backend system share the key used to encrypt and decrypt the capability token.

9. The system of claim 6 wherein the instructions, when executed by the processor, further perform a fourth transaction, prior to the first transaction, wherein the backend system provides the security token service the ability to grant capability tokens.

10. The system of claim 6 wherein the instructions, when executed by the processor, further perform the steps of:
- receiving a delegation token in the security token service from the backend system;
- sending, with the capability token during the second transaction, the delegation token from the security token service to the software service consumer; and
- receiving, with the capability token during the third transaction, the delegation token from the software service consumer in the backend system; and
- verifying that the delegation token was issued by the backend system to the security token service.

11. A non-transitory computer readable storage medium including processor executable instructions which when executed cause the processor to perform a method, the method comprising:
- performing a first transaction between a software service consumer and a license token service, the first transaction comprising:
  - receiving a license token request from the software service consumer, and
  - sending a license token to the software service consumer in response to the license token request, wherein the license token is encrypted by a key shared between the license token service and a security token service;
- performing a second transaction between the software service consumer and the security token service, the second transaction comprising:
  - receiving a capability token request from the software service consumer, the capability token request including the encrypted license token and identifying one or more particular software services to be accessed on a backend system,
  - decrypting the encrypted license token with the key shared between the license token service and a security token service, and
  - sending a capability token to the software service consumer in response to the capability token request, wherein the capability token is encrypted by a key shared between the security token service and the backend system, the capability token including information identifying the one or more particular software services to be accessed on the backend system;
- performing a third transaction between the software service consumer and the backend system, the third transaction comprising:
  - receiving a service request from the software service consumer, the service request including the encrypted capability token,
  - decrypting the capability token with the key shared between the security token service and the backend system, generating a new capability token including information identifying the one or more particular software services to be accessed on the backend system, sending the new capability token to the software service consumer, receiving a service request from the software service consumer comprising the new capability token and an identification of the one or more particular software services to be accessed on the backend system, and executing the service request on the one or more particular software services to be accessed on the backend system.

12. The non-transitory computer readable medium of claim 11, the method further comprising a fourth transaction, prior to the first transaction, wherein the security token service and the license token service share the key used to encrypt and decrypt the license token.

13. The non-transitory computer readable medium of claim 11, the method further comprising a fourth transaction, prior to the first transaction, wherein the security token service and the backend system share the key used to encrypt and decrypt the capability token.

14. The non-transitory computer readable medium of claim 11, the method further comprising a fourth transaction, prior to the first transaction, wherein the backend system provides the security token service the ability to grant capability tokens.

15. The non-transitory computer readable medium of claim 11, the method further comprising:

receiving a delegation token in the security token service from the backend system;

sending, with the capability token during the second transaction, the delegation token from the security token service to the software service consumer; and receiving, with the capability token during the third transaction, the delegation token from the software service consumer in the backend system; and verifying that the delegation token was issued by the backend system to the security token service.

* * * * *